United States Patent
Chen

(10) Patent No.: US 8,330,901 B2
(45) Date of Patent: Dec. 11, 2012

(54) TRANSFLECTIVE DISPLAY DEVICE

(75) Inventor: Wen-Zheng Chen, Taipei County (TW)

(73) Assignee: Chunghwa Picture Tubes, Ltd., Bade, Taoyuan (TW)

( * ) Notice: Subject to any disclaimer, the term of this patent is extended or adjusted under 35 U.S.C. 154(b) by 155 days.

(21) Appl. No.: 12/983,891

(22) Filed: Jan. 4, 2011

(65) Prior Publication Data

US 2012/0026434 A1 Feb. 2, 2012

(30) Foreign Application Priority Data

Jul. 29, 2010 (TW) .............................. 99214516 U

(51) Int. Cl.
*G02F 1/1335* (2006.01)
(52) U.S. Cl. ........................... 349/74; 349/114; 345/107
(58) Field of Classification Search .................. 345/107; 349/74, 114
See application file for complete search history.

(56) References Cited

U.S. PATENT DOCUMENTS

| | | |
|---|---|---|
| 6,621,541 B1 | 9/2003 | Choi |
| 2010/0002020 A1 | 1/2010 | Roosendaal |
| 2010/0060823 A1 * | 3/2010 | Ju et al. ........................... 349/74 |

FOREIGN PATENT DOCUMENTS

TW I306533 2/2009

OTHER PUBLICATIONS

Lenssen, "Novel concept for full-color electronic paper", Journal of the SID Apr. 17, 2009, p. 383-388.
Zhu, "Transflective Liquid Crystal Displays", IEEE/OSA Journal of Display Technology vol. 1, No. 1, p. 15-29, Sep. 2005.

* cited by examiner

*Primary Examiner* — Phu Vu
(74) *Attorney, Agent, or Firm* — Winston Hsu; Scott Margo

(57) ABSTRACT

A transflective display device of the present invention includes a backlight module, an electrophoretic device, and a liquid crystal panel. The electrophoretic device includes a first substrate; a second substrate; an electrophoretic layer; a collector; a gate electrode and a plurality of transparent electrodes. The first substrate has at least a pixel region, and a device region and a display region are defined in the pixel region. The first substrate is disposed oppositely to the second substrate, and the electrophoretic layer is disposed between the first substrate and the second substrate. The electrophoretic layer includes a transparent fluid and a plurality of opaque charged particles. The collector, the gate electrode, and the plurality of transparent electrodes are disposed between the first substrate and the second substrate, wherein the collector and the gate electrode are disposed in the device region and the transparent electrodes are disposed in the display region.

9 Claims, 10 Drawing Sheets

TRANSFLECTIVE DISPLAY DEVICE

BACKGROUND OF THE INVENTION

1. Field of the Invention

The present invention is related to a transflective display device, and more particularly, to the transflective display device in which the same pixel region is capable of being operated in any one of the modes including a transmission mode, a reflection mode and a transflective mode.

2. Description of the Prior Art

Based on the differences of the light source and the array substrate, the liquid crystal displays (LCDs) may be classified into three types including transmissive LCDs, reflective LCDs, and transflective LCDs. With the popularization of LCDs and portable electronic products, the display quality of LCD in the bright outdoor environment, in the indoor environment, and even in the dark must be all considered. In all of the above conditions, the transflective LCD is a better choice for it can provide the same high contrast image.

The ratio of transmission region to reflective region in each pixel region of the conventional transflective LCD, however, is designed to be constant, which means, the ratio of transmission region to reflective region cannot be adjusted when the viewing environment changes. This restriction makes the conventional transflective LCD unable to select the most adequate display mode from the transmission mode, the reflection mode and the transflective mode, and thus the optimal display quality cannot be obtained.

SUMMARY OF THE INVENTION

It is therefore one of the objectives of the present invention to provide a transflective display device to solve the problems in the conventional display device.

An exemplary embodiment of the transflective display device of the present invention includes a backlight module, an electrophoretic device, and a liquid crystal panel. The backlight module is for emitting a backlight and the electrophoretic device is disposed on the backlight module. Moreover, the electrophoretic device includes a first substrate, a second substrate, an electrophoretic layer, a collector, a gate electrode and a plurality of transparent electrodes. The first substrate has at least a pixel region, and a device region and a display region are defined in the pixel region. The first substrate is disposed oppositely to the second substrate. The electrophoretic layer disposed between the first substrate and the second substrate includes a transparent fluid and a plurality of opaque charged particles. The collector, the gate electrode, and the plurality of transparent electrodes are disposed between the first substrate and the second substrate, wherein the collector and the gate electrode are disposed in the device region, and the plurality of transparent electrodes are disposed in the display region. Further, the liquid crystal panel is disposed on the electrophoretic device.

The transflective display device of the present invention utilizes the collector, the gate electrode, and the plurality of transparent electrodes disposed in the electrophoretic device to change the distribution of the opaque charged particles based on different environmental condition. Accordingly, the pixel regions of the transflective display device are able to be operated in any one of display modes including transmission mode, reflection mode and transflective mode for providing better display quality.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following descriptions and claims to refer to particular components. As one skilled in the art will appreciate, manufacturers may refer to a component by different names. This document does not intend to distinguish between components that differ in name but in function. In the following discussion and in the claims, the terms "include" and "comprise" are used in an open-ended fashion, and thus should be interpreted to mean "including, but not limited to . . . ". Furthermore, the diagrams are meant to explain the invention, but not based on the original scale.

Figure 1:
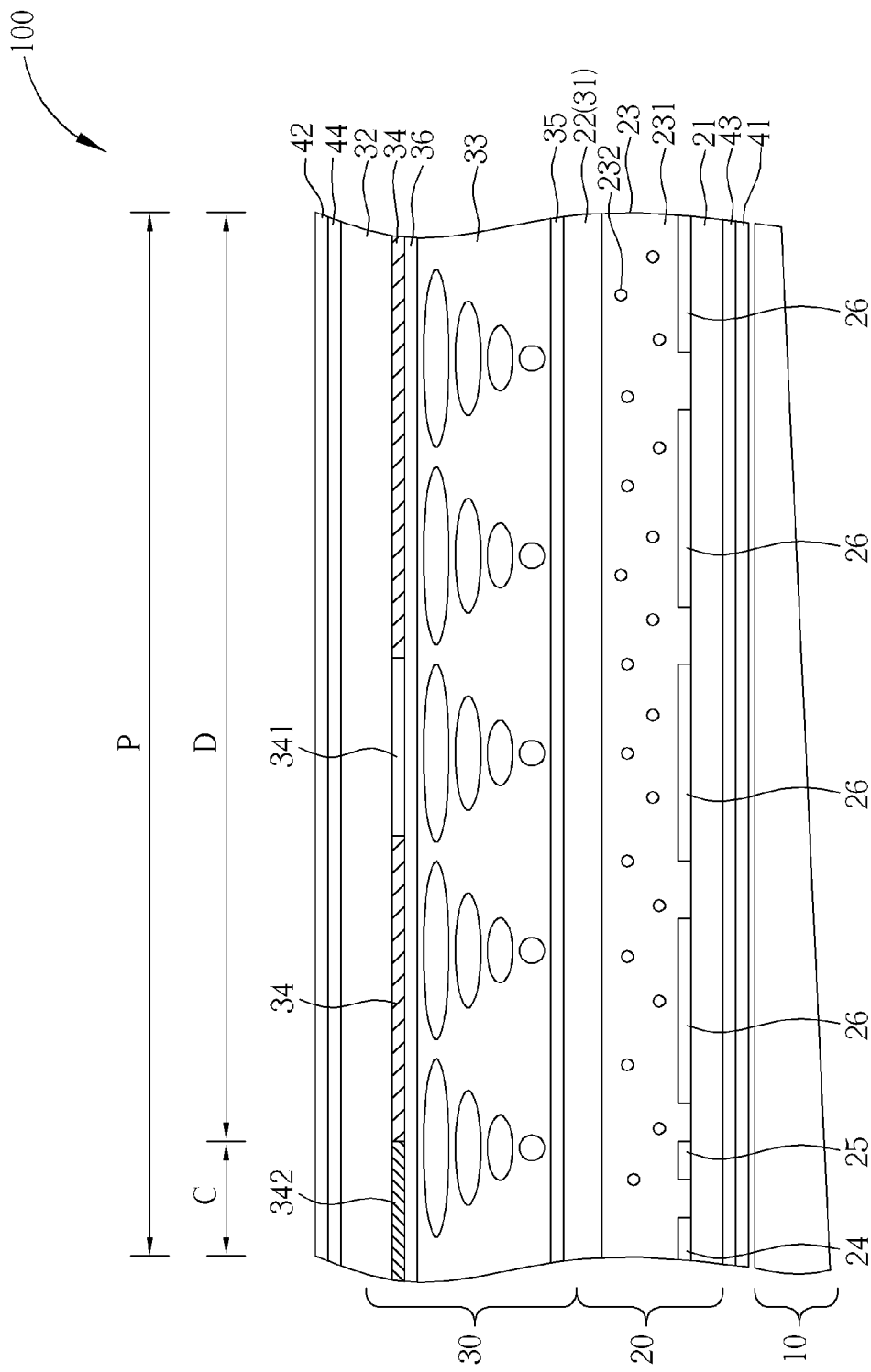
FIG. 1 illustrates a schematic diagram of a transflective display device according to a first exemplary embodiment of the present invention.

Please refer to FIG. 1. FIG. 1 illustrates a schematic diagram of a transflective display device according to a first exemplary embodiment of the present invention. As shown in FIG. 1, the transflective display device 100 comprises a backlight module 10, an electrophoretic device 20, and a liquid crystal panel 30. The backlight module 10 is disposed for emitting a backlight, and the electrophoretic device 20 is disposed on the backlight module 10. Moreover, the electrophoretic device 20 comprises a first substrate 21; a second substrate 22; an electrophoretic layer 23; a collector 24; a gate electrode 25 and a plurality of transparent electrodes 26. The first substrate 21 comprises at least a pixel region P having a device region C and a display region D defined thereon. For simplification, the following description is focused on one pixel region P, but not limited thereto. In other words, the first substrate 21 may have a plurality of pixel regions P. The second substrate 22 is disposed oppositely to the first substrate 21. The electrophoretic layer 23 is disposed between the first substrate 21 and the second substrate 22, and comprises a transparent fluid 231 and a plurality of opaque charged particles 232. The charges of the opaque charged particles 232 can be positive, but not limited thereto. For instance, the charges of the opaque charged particles 232 can also be negative. The collector 24, the gate electrode 25 and the plurality of transparent electrodes 26 are disposed between the first substrate 21 and the second substrate 22. The collector 24 and the gate electrode 25 are disposed in the device region C, and may be made of opaque conductive material such as metal or transparent conductive material such as Indium Tin Oxide (ITO), while the plurality of transparent electrodes 26 disposed in the display region D are made of transparent conductive material. In the first exemplary embodiment of the present invention, the collector 24, the gate electrode 25 and the plurality of transparent electrodes 26 are disposed on the surface of the first substrate 21 facing the second substrate 22, but not limited thereto. That is, in another exemplary embodiment of the present invention, the collector 24 may be disposed on a surface of the second substrate 22 facing the first substrate 21, while the gate electrode 25 and the plurality of transparent electrodes 26 may be disposed on a surface of the first substrate 21 facing the second substrate 22. In other words, the collector 24, the gate electrode 25 and the plurality of transparent electrodes 26 are required to be disposed between the first substrate 21 and the second substrate 22, but are free to be disposed on either the first substrate 21 or the second substrate 22. Furthermore, the collector 24, the gate electrode 25 and the plurality of transparent electrodes 26 are not confined to be disposed on the same substrate.

As shown in FIG. 1, the liquid crystal panel 30 is disposed on the electrophoretic device 20. The liquid crystal panel 30 comprises an array substrate 31, a third substrate 32, a liquid crystal layer 33 and a color filter 34. In the first exemplary embodiment of the present invention, the second substrate 22 of the electrophoretic device 20 is the same substrate as the array substrate 31 of the liquid crystal panel 30, but not limited thereto. The array substrate 31 is disposed oppositely to the third substrate 32, the liquid crystal layer 33 is disposed between the third substrate 32 and the array substrate 31, and the color filter 34 is disposed on the third substrate 32. In a transflective mode, compared to the backlight emitted from the backlight module 10, a reflected light passing through the liquid crystal panel 30 twice suffers a great loss when passing the color filter 34, therefore the color filter 34 may comprise at least an over coat 341, which is transparent, for reducing loss of the reflected light. Moreover, a light-shielding layer 342 may be disposed on the third substrate 32 and substantially corresponds to the device region C of the first substrate 21 for increasing the contrast. In addition, as illustrated in FIG. 1, a pixel electrode 35 is disposed on the array substrate 31, and a common electrode 36 is disposed on the third substrate 32. The voltage difference provided by the pixel electrode 35 and the common electrode 36 controls a plurality of liquid crystals of the liquid crystal layer 33 for providing display images.

Furthermore, the transflective display device 100 also comprises a first polarizer 41, a second polarizer 42, a first wave plate 43, and a second wave plate 44. In the first exemplary embodiment of the present invention, the first polarizer 41 and the first wave plate 43 are disposed on the surface of the first substrate 21 facing the backlight module 10, while the second polarizer 42 and the second wave plate 44 are disposed on the surface of the third substrate 32. It is appreciated that the liquid crystal layer 33 of the first exemplary embodiment is a mixed-mode twisted nematic (MTN) liquid crystal layer. To comply with the MTN liquid crystal layer, in the first exemplary embodiment of the present invention, the first polarizer 41 and the second polarizer 42 possess the same polarization direction; further, the first wave plate 43 and the second wave plate 44 are both ¼ wave plates. That is, the phase difference of a light after passing through the first polarizer 41 and the second polarizer 42 is substantially ¼ wavelength. Compared to the normal twisted nematic liquid crystal layer, the MTN liquid crystal layer provides higher brightness and prevents the parallax issue that the conventional reflective LCD possessed. However, the liquid crystal type of the liquid crystal layer 33 is not limited to MTN, and other types of liquid crystal layer may be utilized as well. For instance, in another exemplary embodiment, the liquid crystal layer 33 in FIG. 1 could be a vertical alignment (VA) type liquid crystal layer. To comply with the VA liquid crystal layer, the first polarizer 41 and the second polarizer 42 are perpendicular or parallel to each other on the basis of the designed phase difference, and the angle of disposing the first polarizer 41 and the second polarizer 42 is unspecified. Also, the angle of disposing the first wave plate 43 and the second wave plate 44 can be determined by the calculation of polarization.

To make one skilled in the art understand the present invention more, other exemplary embodiments of the present invention are discussed in the following paragraphs. With the schematic diagrams illustrating the transflective display device 100 of the first exemplary embodiment of the present invention operated in a transmission mode/a reflection mode/a transflective mode; and the operation voltages of the collector 24, the gate electrode 25 and the transparent electrodes 26 in the three modes, the structure and the effect of the present invention are explained in details. It is to be noted that the operation voltage varies with different transparent fluid 231 and opaque charged particles 232 used in the present invention, and thus the operation voltage in the following description is only for explanation, but not limited thereto. Additionally, to simplify the explanation, FIG. 2, FIG. 4, FIG. 6, and FIG. 8 only illustrate the first substrate 21, the collector 24, the gate electrode 25 and four of the transparent electrodes 26 of the transflective display device 100 shown in FIG. 1, and the charge of the opaque charged particles 232 is positive in the following description, but not limited thereto. The charge of opaque charged particles 232 can also be negative, which can be driven by different electric field.

Figure 2:
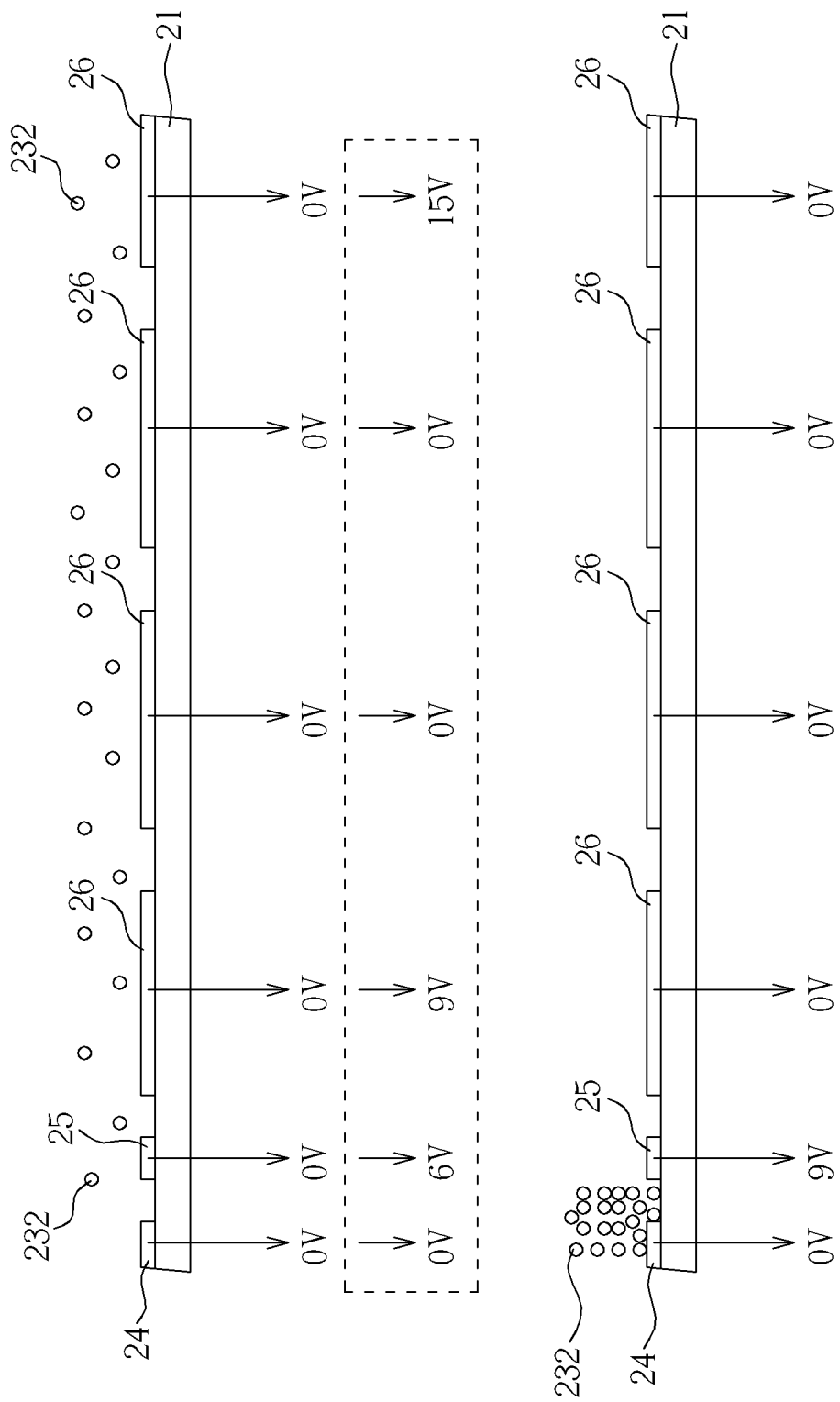
FIG. 2-FIG. 3 illustrate schematic diagrams of a transflective display device according to a first exemplary embodiment of the present invention in a transmission mode.
Figure 3:
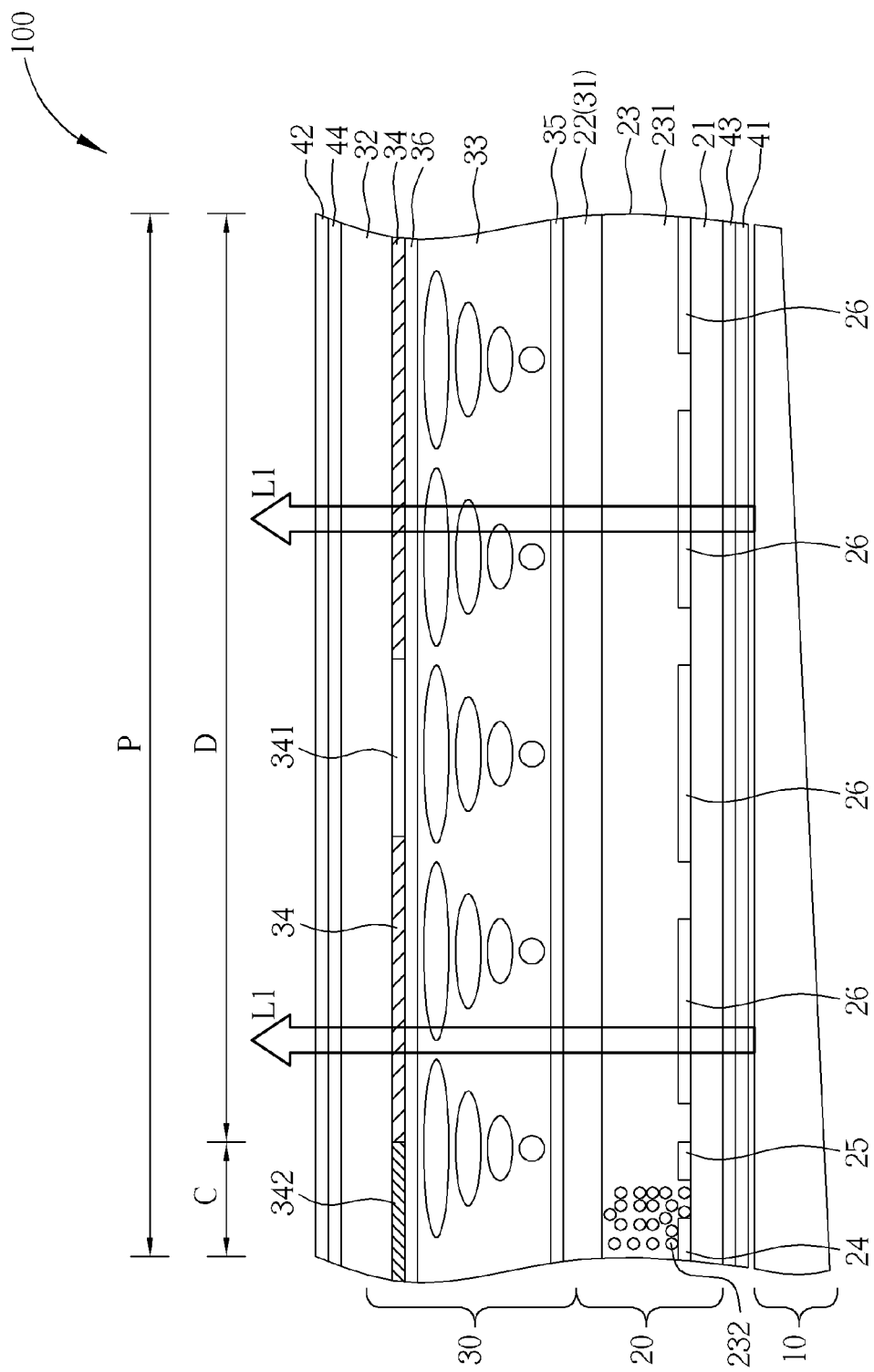

Please refer to FIG. 2-FIG. 3. FIG. 2-FIG. 3 illustrate schematic diagrams of the transflective display device 100 according to the first exemplary embodiment of the present invention in the transmission mode. As shown in FIG. 2, the initial voltage of the collector 24, the gate electrode 25 and the transparent electrodes 26 are zero, and in the meantime, the opaque charged particles 232 are distributed randomly on the first substrate 21. Then, the settings of voltage are adjusted as follows: the voltage of the collector 24 is kept zero, the gate electrode 25 is supplied with a voltage of 6V, the transparent electrode 26 most adjacent to the gate electrode 25 is supplied with a voltage of 9V, and the transparent electrode 26 most away from the gate electrode 25 is supplied with a voltage of 15V. Accordingly, in the present invention, the opaque charged particles 232 are driven to be gathered on the collector 24 by the electric field generated by the voltage difference between the transparent electrode 26 most away from the gate electrode 25 and the gate electrode 25, and by the electric field generated by the voltage difference between the gate electrode 25 and the collector 24 as well. The way to drive the opaque charged particles 232 is not limited thereto, in another exemplary embodiment, the opaque charged particles 232 can also be driven to be gathered on the collector 24 only by the electric field generated by the voltage difference between the transparent electrode 26 most away from the gate electrode 25 and the collector 24. Subsequently, the settings of voltage are adjusted as follows: the gate electrode 25 is supplied with a voltage of 9V, and the voltage of the collector 24 and all of the transparent electrodes 26 are zero. As a result, the opaque charged particles 232 are gathered on the collector 24. Accordingly, as shown in FIG. 3, in the transmission mode, the opaque charged particles 232 are gathered on the collector 24, and the backlight L1 are able to pass through the transparent electrodes 26 to reach the liquid crystal panel 30. In other words, the backlight L1 emitted from the backlight module 10 passes through the electrophoretic device 20, such that the display region D is a transmission region.

Figure 4:
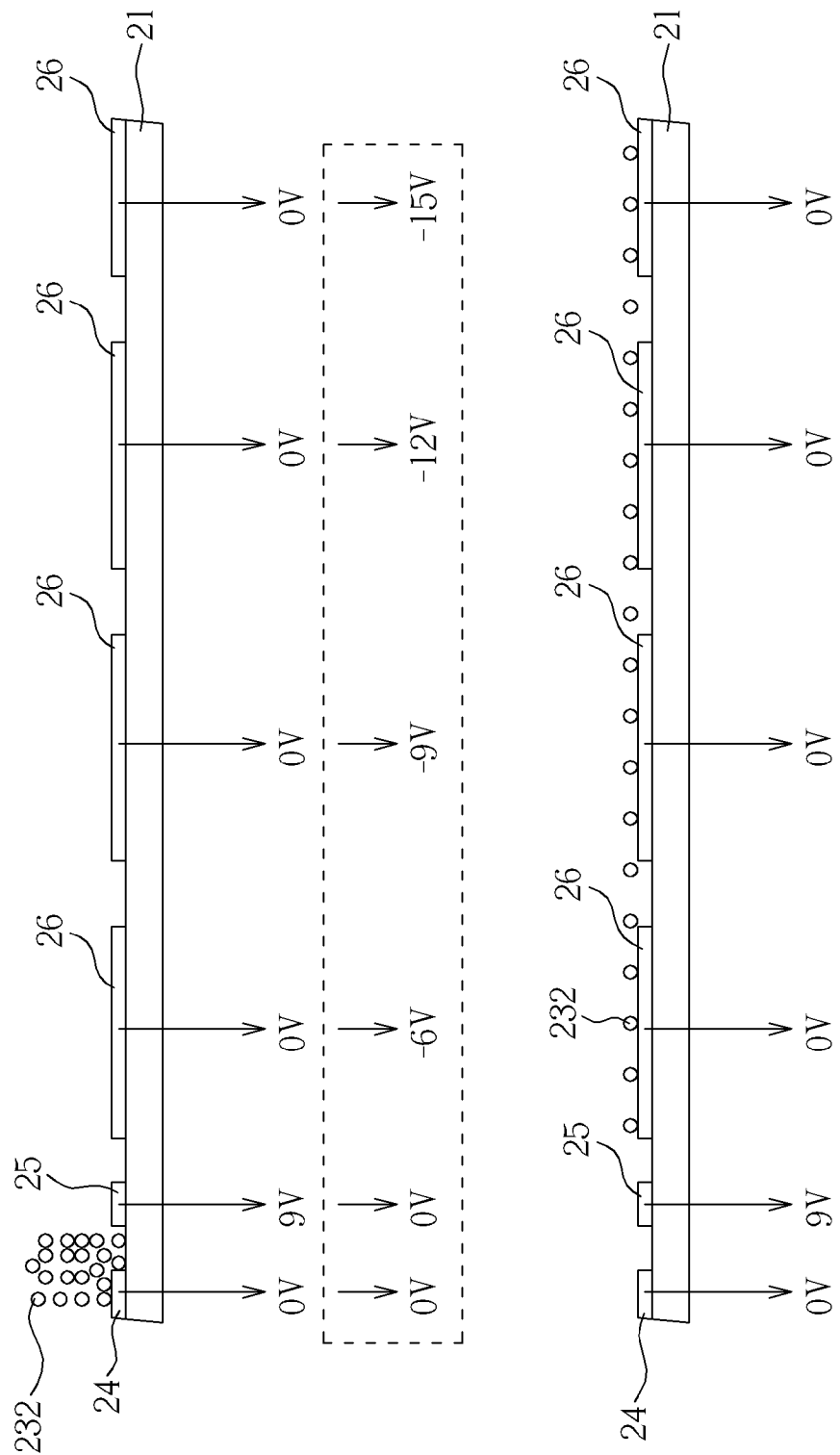
FIG. 4-FIG. 5 illustrate schematic diagrams of a transflective display device according to a first exemplary embodiment of the present invention in a reflection mode.
Figure 5:
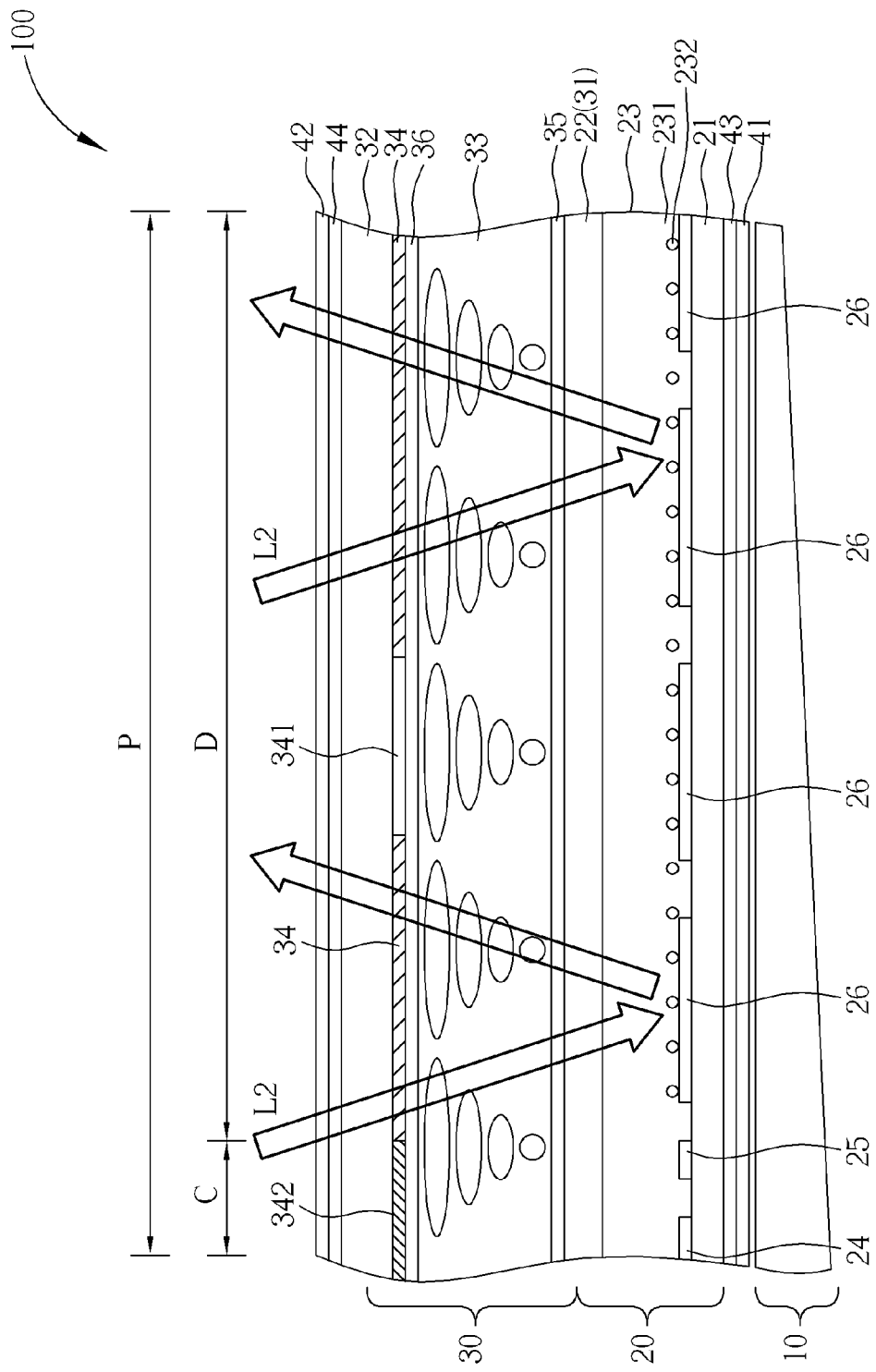

Please refer to FIG. 4-FIG. 5. FIG. 4-FIG. 5 illustrate schematic diagrams of the transflective display device 100 of the first exemplary embodiment of the present invention in the reflection mode. FIG. 4 illustrates the transflective display device 100 of the first exemplary embodiment when switching to the reflection mode. It is appreciated that before switching to the reflection mode, a reset procedure substantially identical to the steps shown in FIG. 2 is suggested. The reset procedure gathers the opaque charged particles 232 on the collector 24 for in advance to proceed the following progress. As illustrated in FIG. 4, the initial voltage of the collector 24 and the transparent electrodes 26 are zero, while the initial voltage of the gate electrode 25 is 9V, such that the opaque charged particles 232 are gathered on the collector 24. Then, the settings of voltage are adjusted as follows: the voltage of the collector 24 and the gate electrode 25 are zero, while the four transparent electrodes 26 are supplied with voltages of −6V, −9V, −12V, −15V, respectively, based on the distance of the transparent electrode 26 from the gate electrode 25. That is, the voltage of the transparent electrode 26 adjacent to the gate electrode 25 is set higher than the voltage of the transparent electrode 26 away from the gate electrode 25 Accordingly, in the present invention, the opaque charged particles 232 are driven to cover the transparent electrodes 26 from the collector 24 by the electric field generated by the voltage difference between the transparent electrodes 26 and the collector 24. Additionally, the opaque charged particles 232 can be dispersed uniformly on the four transparent electrodes 26 by the electric field generated by the voltage difference between the two neighboring transparent electrodes 26. Subsequently, the settings of voltage are adjusted as follows: the voltage of the gate electrode 25 is 9V, and the voltage of the collector 24 and all of the transparent electrodes 26 are adjusted to zero. Consequently, the opaque charged particles 232 can be maintained on the transparent electrodes 26. Accordingly, as shown in FIG. 5, in the reflection mode, the transparent electrodes 26 are covered with the opaque charged particles 232 for reflecting the ambient light L2. In other words, the display region D is a reflective region in this exemplary embodiment.

Figure 6:
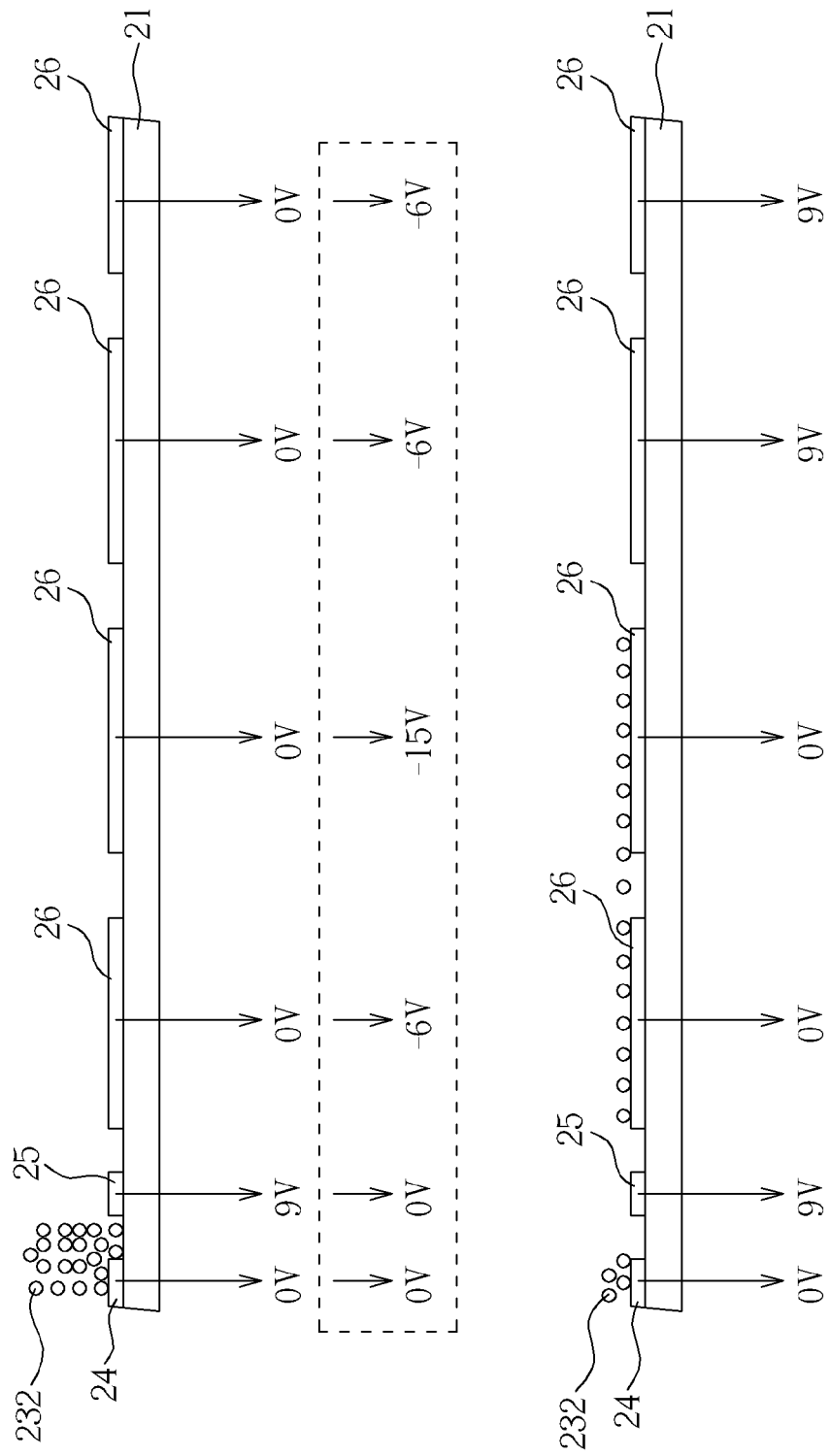
FIG. 6-FIG. 7 illustrate schematic diagrams of a transflective display device according to a first exemplary embodiment of the present invention in a transflective mode.
Figure 7:
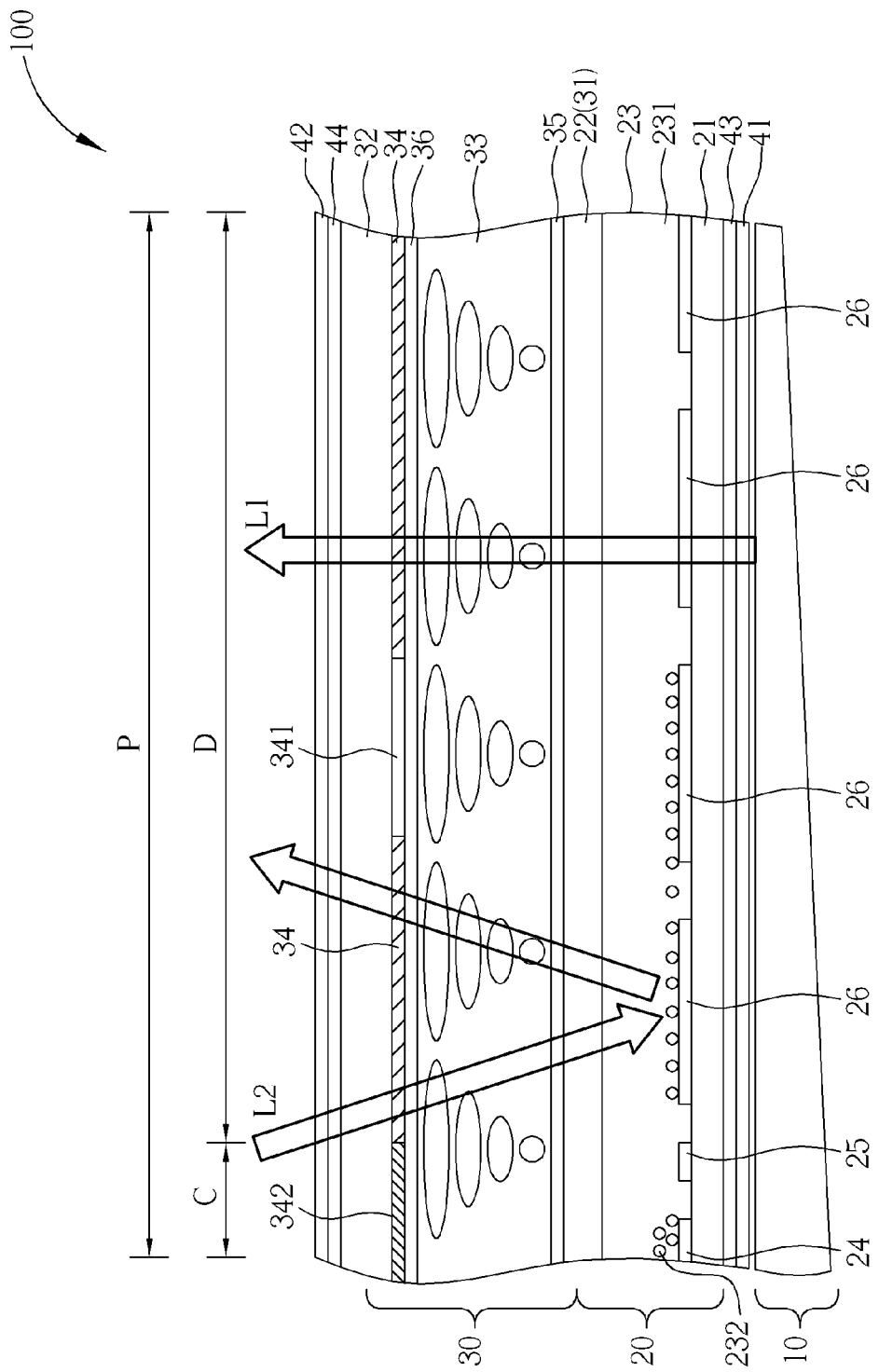

Please refer to FIG. 6-FIG. 7. FIG. 6-FIG. 7 illustrate schematic diagrams of the transflective display device 100 of the first exemplary embodiment of the present invention in the transflective mode. FIG. 6 illustrates the transflective display device 100 of the first exemplary embodiment when switching from the transmission mode to the transflective mode. As shown in FIG. 6, the initial voltage of the collector 24 and the transparent electrodes 26 are zero, while the initial voltage of the gate electrode 25 is 9V, such that the opaque charged particles 232 are gathered on the collector 24. Then, the settings of voltage are adjusted as follows: the voltage of the collector 24 and the gate electrode 25 are zero, while the four transparent electrodes 26 are supplied with voltages of −6V, −15V, −6V, −6V, respectively. That is, the voltage of one of the transparent electrodes 26 is lower than the voltage of the other transparent electrodes 26. Accordingly, in the present invention, the opaque charged particles 232 are driven to cover the transparent electrodes 26 from the collector 24 by the electric field generated by the voltage difference between the transparent electrodes 26 and the collector 24. Additionally, a portion of the transparent electrodes 26 (such as the two transparent electrodes 26 adjacent to the gate electrode 25 in FIG. 6) are covered with the opaque charged particles 232 by the electric field generated by the voltage difference between the transparent electrode 26 with lower voltage and the other transparent electrodes 26 with higher voltage. Subsequently, in order to keep the distribution of the opaque charged particles 232, the settings of voltage are adjusted as follows: the voltage of the collector 24 and two of the transparent electrodes 26 adjacent to the gate electrode 25 are adjusted to be zero, while the gate electrode 25 and the other transparent electrodes 26 are supplied with a voltage of 9V. Accordingly, as shown in FIG. 7, in the transflective mode, a portion of the transparent electrodes 26 is covered with a plurality of the opaque charged particles 232 for reflecting the ambient light L2, and the backlight L1 passes through the transparent electrodes 26 uncovered by the opaque charged particles 232 to reach the liquid crystal panel 30. In other words, the display region D has both of a reflective region and a transmission region in this exemplary embodiment.

Figure 8:
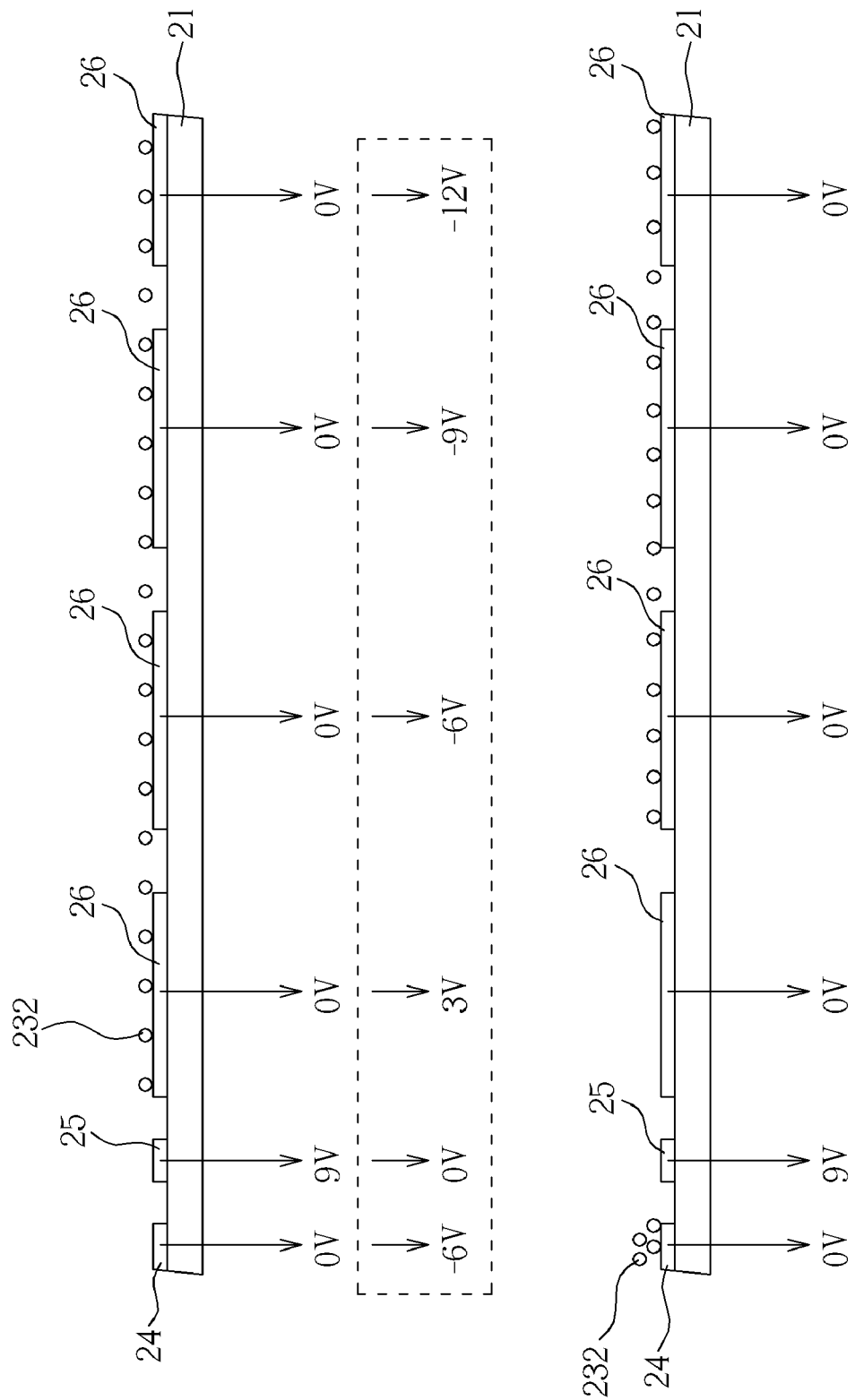
FIG. 8-FIG. 9 illustrate additional schematic diagrams of a transflective display device according to a first exemplary embodiment of the present invention in a transflective mode.
Figure 9:
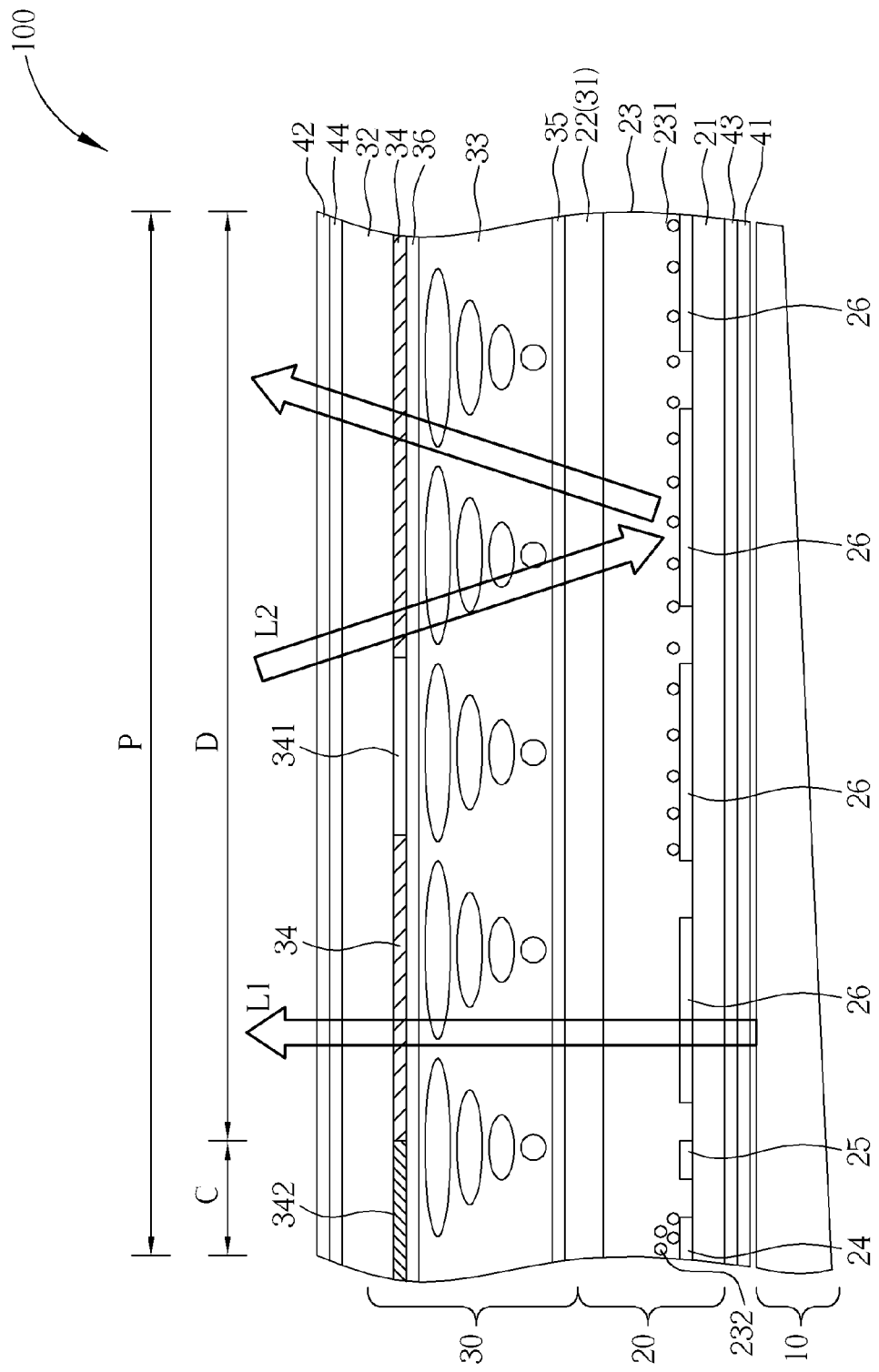

Please refer to FIG. 8-FIG. 9. FIG. 8-FIG. 9 illustrate other schematic diagrams of the transflective display device 100 of the first exemplary embodiment of the present invention in the transflective mode. FIG. 8 illustrates the transflective display device 100 of the first exemplary embodiment when switching from the reflection mode to the transflective mode. As shown in FIG. 8, the initial voltage of the collector 24 and the transparent electrodes 26 are zero, and the initial voltage of the gate electrode 25 is 9V to keep the opaque charged particles 232 on the transparent electrodes 26. Then, the settings of voltage are adjusted as follows: the collector 24 is supplied with a voltage of −6V, the voltage of the gate electrode 25 is zero, and the four transparent electrodes 26 are provided with voltages of 3V, −6V, −9V, −12V, respectively. Accordingly, in the present invention, a portion of the opaque charged particles 232 are driven to the collector 24 by the electric field generated by the voltage difference between the transparent electrode 26 with higher voltage and the collector 24. Additionally, a portion of the opaque charged particles 232 are driven to the other transparent electrodes 26 by the electric field generated by the voltage difference between the transparent electrode 26 with higher voltage and the other transparent electrodes 26 with lower voltage. Moreover, the opaque charged particles 232 are dispersed uniformly on the three transparent electrodes 26 by the electric field generated by the voltage difference between the two neighboring transparent electrodes 26. Subsequently, the settings of voltage are adjusted as follows: the gate electrode 25 is supplied with a voltage of 9V, and the voltage of the collector 24 and all of the transparent electrodes 26 are zero, so as to keep the opaque charged particles 232 on the transparent electrodes 26. Accordingly, as shown in FIG. 9, in the transflective mode, a portion of the transparent electrodes 26 is covered with a plurality of the opaque charged particles 232 for reflecting the ambient light L2, and the backlight L1 passes through the transparent electrodes 26 uncovered by the opaque charged particles 232 to reach the liquid crystal panel 30. In other words, the display region D has both of the reflective region and the transmission region in this exemplary embodiment. Particularly, the two exemplary embodiments in FIG. 9 and FIG. 7 are both in the transflective mode, but the ratio of the area of the reflective region to the area of the transmission region is different. More specifically, the ratio of the area of the reflective region to the area of the transmission region can be arranged on the basis of the difference of the operational environment conditions.

Figure 10:
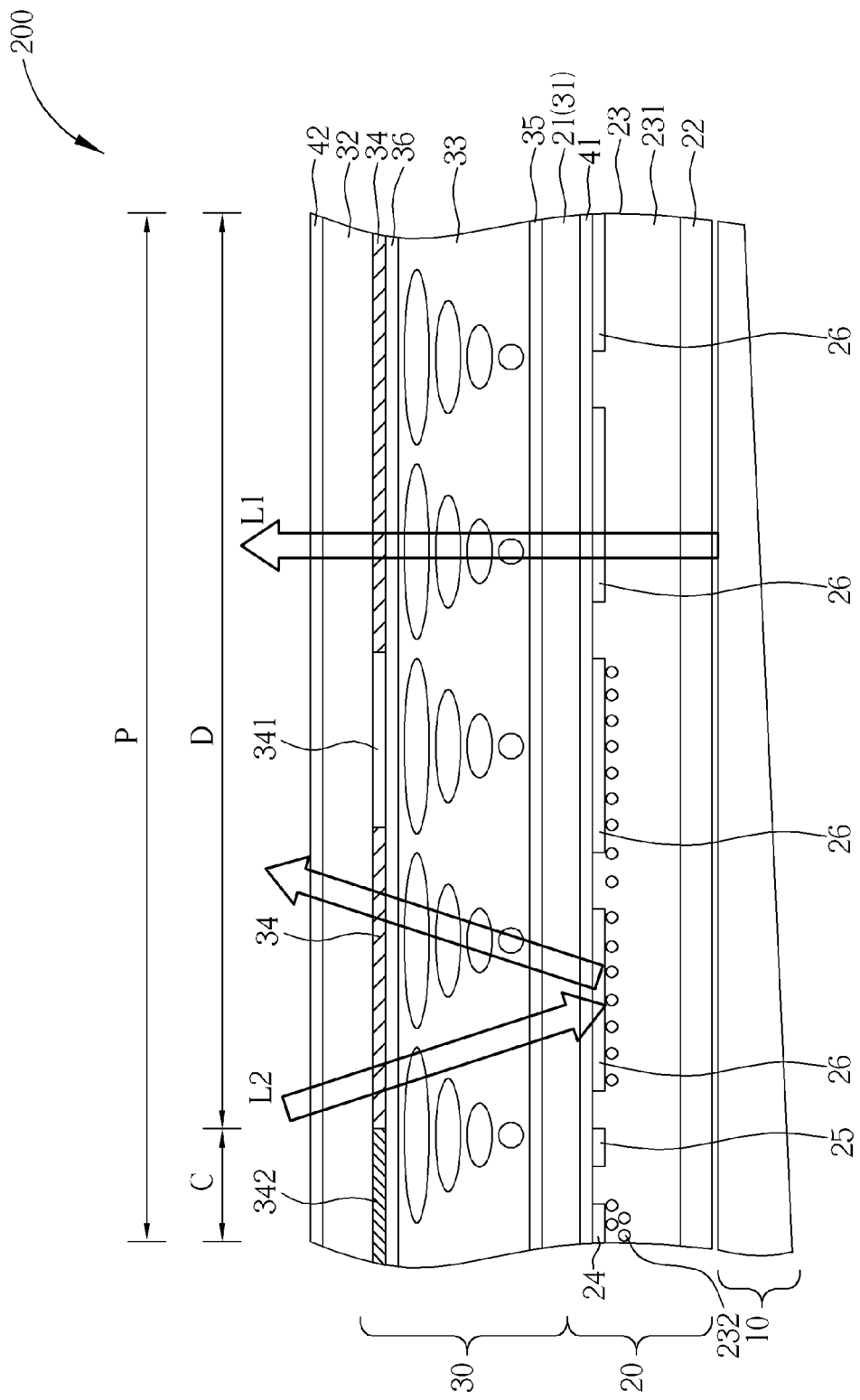
FIG. 10 illustrates a schematic diagram of a transflective display device according to a second exemplary embodiment of the present invention.

The transflective display device of the present invention is not limited to the first exemplary embodiment. To simplify the explanation and to clarify the comparison, in the following exemplary embodiments, the same components are denoted by the same numerals, and the differences are mainly discussed while the similarities are not described again. Please refer to FIG. 10. FIG. 10 illustrates a schematic diagram of a transflective display device 200 according to a second exemplary embodiment of the present invention. One of the differences between the first exemplary embodiment and the second exemplary embodiment is that the liquid crystal layer 33 is different. The second exemplary embodiment utilizes twisted nematic (TN) liquid crystal layer as the liquid crystal layer 33. To comply with the TN liquid crystal layer, in the second exemplary embodiment of the present invention, the disposition of the ¼ wave plate is unnecessary, and the first polarizer 41 is disposed above the opaque charged particles 232 which are able to reflect light. More specifically, the first polarizer 41 in the second exemplary embodiment is disposed on the surface of the second substrate 22 facing the first substrate 21. Additionally, another difference between the first exemplary embodiment and the second exemplary embodiment is that the first substrate 21 of the electrophoretic device 20 is the same substrate as the array substrate 31 of the liquid crystal panel 30. In the other words, the collector 24, the gate electrode 25 and the transparent electrodes 26 are disposed on the substrate nearby the liquid crystal panel 30. Accordingly, in the second exemplary embodiment, the electric field profile provided by the collector 24, the gate electrode 25 and the transparent electrodes 26 are also utilized to change the distribution of the opaque charged particles 232 based on the environmental condition for switching the corresponding pixel region mode to the most adequate display mode (transmission mode, reflection mode, or transflective mode) for the best display quality.

In conclusion, in the transflective display device of the present invention, the electrophoretic device has the opaque charged particles, the collector, the gate electrode and the transparent electrodes disposed therein and the electrophoretic device is disposed between the backlight module and the liquid crystal panel. Moreover, the present invention utilizes the electric field profile from the collector, the gate electrode and the transparent electrodes for changing the distribution of the opaque charged particles. Accordingly, based on the environmental condition, the pixel regions of the transflective display device are able to be operated in any one of display modes including transmission mode, reflection mode and transflective mode for providing better display quality. Furthermore, in the transflective mode, the ratio of the area of the reflective region to the area of the transmission region can be arranged by the electric field profile provided by the collector, the gate electrode and the transparent electrodes to meet the requirements of the various operational environments.

Those skilled in the art will readily observe that numerous modifications and alterations of the device and method may be made while retaining the teachings of the invention.

What is claimed is:

1. A transflective display device, comprising:
   a backlight module for emitting a backlight;
   an electrophoretic device disposed on the backlight module, the electrophoretic device comprising:
      a first substrate comprising at least a pixel region, wherein the pixel region has a device region and a display region;
      a second substrate disposed oppositely to the first substrate;
      an electrophoretic layer disposed between the first substrate and the second substrate, the electrophoretic layer comprising a transparent fluid and a plurality of opaque charged particles; and
      a collector, a gate electrode, and a plurality of transparent electrodes disposed between the first substrate and the second substrate, wherein the collector and the gate electrode are disposed in the device region, and the plurality of transparent electrodes are disposed in the display region; and
   a liquid crystal panel disposed on the electrophoretic device;
   wherein in a transflective mode, a portion of the transparent electrodes is covered with the opaque charged particles for reflecting an ambient light, and the backlight passes through the transparent electrodes uncovered by the opaque charged particles to reach the liquid crystal panel.

2. The transflective display device of claim 1, wherein in a transmission mode, the opaque charged particles are gathered on the collector, and the backlight passes through the transparent electrodes to reach the liquid crystal panel.

3. The transflective display device of claim 1, wherein in a reflection mode, the transparent electrodes are covered with the opaque charged particles for reflecting an ambient light.

4. The transflective display device of claim 1, wherein the collector, the gate electrode, and the plurality of transparent electrodes are disposed on a surface of the first substrate facing the second substrate.

5. The transflective display device of claim 1, wherein the liquid crystal panel comprises:
   a third substrate;
   a color filter disposed on the third substrate;
   an array substrate disposed oppositely to the third substrate; and
   a liquid crystal layer disposed between the third substrate and the array substrate.

6. The transflective display device of claim 5, wherein the color filter comprises at least a transmission region for reducing loss of a reflected light.

7. The transflective display device of claim 5, further comprising a light-shielding layer disposed on the third substrate and substantially corresponding to the device region of the first substrate.

8. The transflective display device of claim 5, wherein the second substrate of the electrophoretic device is the same substrate as the array substrate of the liquid crystal panel.

9. The transflective display device of claim 5, wherein the first substrate of the electrophoretic device is the same substrate as the array substrate of the liquid crystal panel.

* * * * *